J. L. WILDS.
WINDING MACHINE.
APPLICATION FILED JUNE 23, 1909.
1,014,860.
Patented Jan. 16, 1912.
2 SHEETS—SHEET 1.
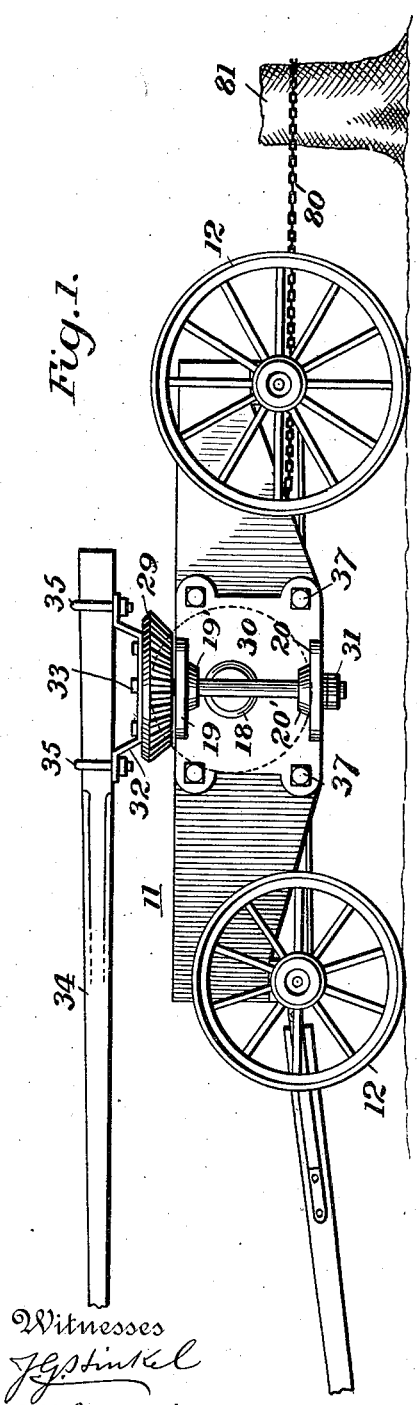
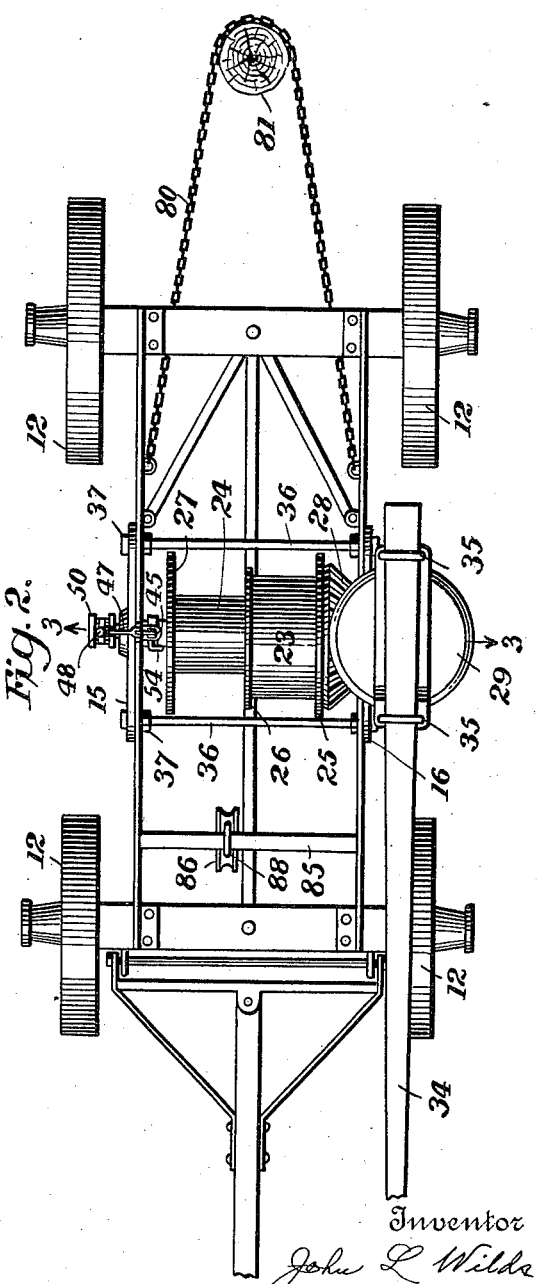

J. L. WILDS.
WINDING MACHINE.
APPLICATION FILED JUNE 23, 1909.
1,014,860.
Patented Jan. 16, 1912.
2 SHEETS—SHEET 2.
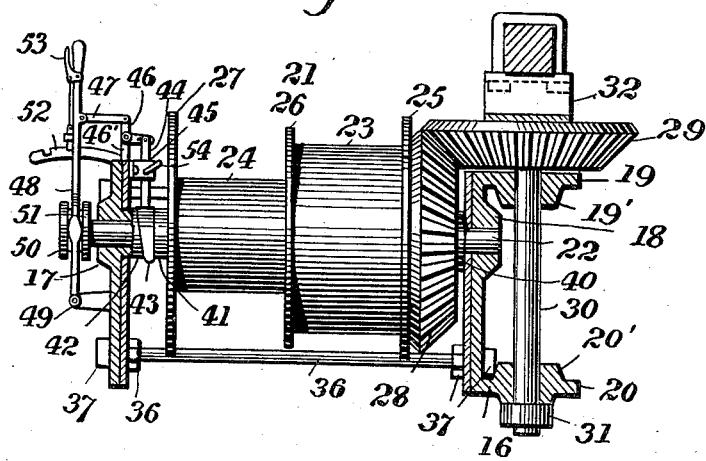
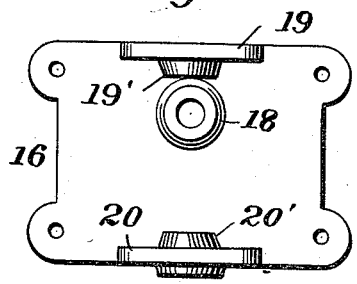
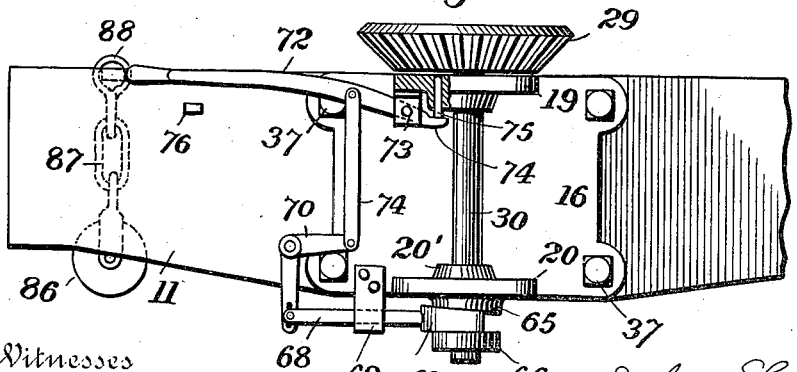

UNITED STATES PATENT OFFICE.

JOHN L. WILDS, OF DARLINGTON, SOUTH CAROLINA.

WINDING-MACHINE.

1,014,860.   Specification of Letters Patent.   Patented Jan. 16, 1912.

Application filed June 23, 1909. Serial No. 503,923.

*To all whom it may concern:*

Be it known that I, JOHN L. WILDS, a citizen of the United States, and resident of Darlington, in the county of Darlington and State of South Carolina, have invented certain new and useful Improvements in Winding-Machines, of which the following is a specification.

This invention relates to winding machines, and in particular to winding machines of the portable type suitable for logging purposes.

The objects of this invention are to provide a machine which will be simple in construction, durable, and so constructed that all working parts will be maintained in alinement.

The invention generally stated consists in a portable frame comprising two side members provided with bearings for supporting the winding drum. This drum is provided with a bevel-gear which meshes with a coöperating bevel-gear mounted on one of the side members. The operating beam is directly connected to the second or driving bevel-gear. The bearing for the bevel-gear end of the drum and the bearing for the driving bevel-gear are formed integrally. In this way it is insured that the gears will always remain in alinement. The bearings for the drum and the bevel-gears are connected by staybolts passing through the side-members. Means is provided for throwing the mechanism out of gear by shifting the drum bevel-gear and the driving bevel-gear relative to each other. The frame for the drum is preferably mounted upon wheels so as to be portable.

In the drawings: Figure 1 is a side elevation of the winding machine; Fig. 2 is a plan view; Fig. 3 is a section on the line 3—3 of Fig. 2, parts being shown in elevation; Fig. 4 is a detail view of one of the bearing plates for supporting the drum and the driving bevel-gear; and Fig. 5 is a detail view showing another form of this invention.

Referring to the drawings, the frame of the machine is composed of a pair of side members 11, 11 of heavy sheet metal supported by the axles as shown. The frame is supported by wheels 12 so as to render the machine portable. A pair of bearing plates 15, 16 are secured to the side members 11 in a manner to be described. The plates 15 and 16 are provided with bosses 17 and 18 to form bearing lugs for the drum. The plate 16 is also provided with a pair of brackets 19, 20 provided with bosses 19', 20' to form bearings for the shaft of the driving bevel-gear. The drum 21 is provided with a shaft 22 mounted in the bearing lugs 17, 18. This drum is preferably composed of sections 23, 24 of different diameters and provided with flanges 25, 26 and 27. The drum is also provided with a bevel-gear 28, preferably cast integrally therewith or bolted thereto. A driving bevel-gear 29 meshes with the bevel-gear 28 and is mounted upon a shaft 30 journaled in the brackets 19 and 20. The shaft 30 is provided with a collar 31 to retain the gears in mesh. A stirrup bracket 32, preferably composed of heavy sheet metal, is bolted directly to the bevel-gear 29 by means of bolts 33. The operating arm or beam 34 is bolted to this bracket by means of the U-bolts 35. The side members 11 are rigidly connected by staybolts 36 spaced around the drum as shown and passing through the plates 15, 16. Nuts 37 are threaded upon these staybolts and serve to rigidly connect the parts together.

The bevel-gear 28 is provided with a boss 40, and the other end of the drum is provided with a boss 41. This boss 41 may be a collar loosely mounted upon the shaft 22. A collar 42 is cast integrally with box 15 so as to always remain in same position. This collar is provided with an inclined surface which coöperates with the inclined surface of the sliding wedge 43, which straddles and slides upon the shaft 22. The wedge is provided with a shank 44, which is guided in its movements by the box 45. One arm of a bell crank lever 46, pivoted in a bracket 46' upon the side member 11 or the plate 15, is connected by a pin and slot connection to the shank 44, and the other arm of the bell crank lever is connected by a link 47 to the operating lever 48, pivoted upon a bracket 49 secured or cast integrally with the plate 15. A pair of collars 51 are rigidly secured to the shaft 22. These collars are mounted upon opposite sides of the lever 48. The segment 52 is secured to the plate 15 and provided with notches which are engaged by a latch member upon the operating lever 48, operated by the latch lever 53. The operating lever 48 is provided with an opening which straddles the shaft 22. The collars 50 and 51 may be in a single piece and removed from the shaft 22 as a unit. However, by securing them separately to the shaft 22 the construction is simplified and the mechanism may be more easily assembled.

The drum 21 and its bevel-gear 28 may be moved axially so as to move the bevel-gears out of mesh by means of the operating lever 48. By moving the lever 48 to the left from the position shown in Fig. 3, the wedge 43 will be withdrawn and the shaft 22 and the drum and bevel-gear secured thereto will be moved to the left so as to move the gear 28 out of mesh with gear 29, and the parts may be locked in this position by the latch upon the operating lever. When the lever 48 is moved to the right, the shaft 22 is moved to the right so as to throw the gears into mesh and the wedge 43 is moved down so as to securely lock the parts in position. An additional locking means 54, consisting of a setscrew provided with a handle, may be provided to lock the parts in position. By the provision of this locking means 54 the latch upon the operating lever and the segment 52 may be dispensed with.

It will be noted that, when the winding drum is in operative position so that the gears are in mesh, the bosses 40 and 41, the collar 42 and the wedge 43 will maintain this drum against endwise movement. Since the brackets 19, 20 and the boss 18 are integral with the plate 16, it is insured that the gears 28, 29 will always be maintained in mesh and in proper alinement. The stay bolts 36, which pass through the side members and the plates 15, 16, rigidly maintain the drum in position in its bearings, and all wear may be taken up by tightening and loosening the nuts 37. By bolting the bracket 32 directly to the bevel-gear 29 the shaft 30 may be made very light, since it need only withstand the shearing strain due to the force tending to separate the bevel-gears 28, 29 while they are in operation. This construction has a decided advantage over those constructions in which the operating beam or lever 34 is connected to the shaft 30. In such a case the shaft 30 is put under torsional strain, which not only is liable to cause the shaft to fail, but does not give the rigid construction of this invention.

By dividing the drum into sections of different diameters the machine is readily adapted to different loads. This is a very convenient construction, since the cable may be wound on the small drum 24 when a heavy log is to be moved and shifted over to the large drum 23 when a light log is to be moved.

Fig. 5 shows another form of this invention. The bracket 20 is provided with a boss 65, the lower surface of which is inclined and engages the inclined surface of a sliding wedge 67 which straddles the shaft 30 and engages a collar 66 rigidly secured to the shaft 30. The wedge is mounted upon a shank 68 sliding in the box 69 secured to the plate 16. One arm of the bell crank lever 70 pivoted upon the side member connects with the shank 68, while the other arm connects through a link 71 with an operating lever 72 mounted upon a bracket 73. The toe 74 of the lever engages the pin 75 slidingly mounted in the bracket 19. By moving the lever 72 downwardly the wedge 67 is withdrawn and the toe 74 raises it out of mesh with the bevel-gear 28. A latch 76 is provided to hold the parts in position. The above mechanism for throwing the gears into and out of mesh is an alternate arrangement of that shown in Fig. 3. Therefore when the arrangement in Fig. 5 is used the arrangement in Fig. 3 is dispensed with. In this case the length of the drum is increased so that the boss 41 will bear against the side member 11. The frame is provided with an anchor chain 80 which may be thrown around a stump 81 or a stake so as to anchor it in position.

It is obvious that various changes may be made in the details of construction without departing from this invention, and it is therefore to be understood that this invention is not to be limited to the specific constructions shown.

A brace or cross bar 85 extends across the frame and is bolted to the side members 11. A guide pulley 86 is supported from brace 85 by means of a link 87 and ring 88 slidable along 85. By means of this construction the pulley can both slide and swing laterally as well as forwardly and backwardly. This pulley guides the cable on the drums and allows logs to be drawn from positions not in front of the machine. The drum is bedded down low so as to allow the machine to be used without removing the wheels.

What I claim is:

1. In a winding machine, in combination, a supporting frame including side members provided with bearing plates, a drum provided with a bevel-gear on one end thereof and journaled in the bearing plates, a driving bevel-gear journaled on one of the plates and in mesh with the bevel-gear on the drum, and staybolts connecting the side members and bearing plates and spaced around the drum.

2. In a winding machine, in combination, a supporting frame including sheet metal side members, a drum provided with a bevel gear, a meshing driving bevel gear, a bearing in one of said side members for one end of said drum, a bearing plate secured to the other side member, a bearing in said bearing plate for the other end of said drum, spaced bearing lugs formed integral with said plate, a shaft for said driving bevel gear journaled in said bearing lugs and means for sliding said shaft longitudinally.

3. In a winding machine, in combination, a supporting frame including side members, a drum provided with a bevel-gear, a meshing driving bevel-gear, a bearing for one end of the drum, a plate secured to one of the side members, bearings for the other end of the drum and the driving bevel-gear integral with the plate, and staybolts connecting the side members spaced around the drum and passing through the plate.

4. In a winding machine, in combination, a supporting frame including side members, a drum having a bevel-gear secured to one end thereof, a meshing bevel-gear, a bearing plate for one end of the drum on one of the side members, a plate secured to the other side member, bearings for the bevel-gear end of the drum and the driving bevel-gear integral with the plate, and staybolts connecting the side members spaced around the drum and passing through the plates.

5. In a winding machine, in combination, a supporting frame, a drum having a bevel-gear secured thereto, a driving bevel-gear meshing therewith, shafts and bearings for the drum and driving bevel-gear, means for shifting one of said shafts axially to shift the gears into and out of mesh, and a sliding wedge to hold and lock them in mesh.

6. In a winding machine, in combination, a supporting frame, a drum having a bevel-gear secured thereto and provided with a shaft, bearings for said shaft, a meshing driving bevel-gear provided with a supporting shaft mounted in said frame, a lever engaging one of said shafts to move it axially so as to shift said gears into and out of mesh, and a sliding wedge on the shaft to hold and lock the gears in mesh.

7. In a winding machine, in combination, a supporting frame including a pair of side members, a drum having a bevel-gear secured thereto and provided with a shaft, a meshing driving bevel-gear, a bearing mounted in one of the side members for one end of the shaft, a bearing plate mounted in the other side member, bearings for the gear end of the shaft and the driving bevel-gear integral with the plate, staybolts connecting the side members spaced around the drum and passing through the plate, a lever engaging the shaft to move it axially, and a sliding wedge between the end of the drum and one side member operatively connected with the lever.

In testimony whereof I affix my signature in presence of two witnesses.

JOHN L. WILDS.

Witnesses:
  S. H. WILDS,
  E. R. McIVER.

---

Copies of this patent may be obtained for five cents each, by addressing the "Commissioner of Patents, Washington, D. C."